US010853214B2

(12) United States Patent
Lee

(10) Patent No.: US 10,853,214 B2
(45) Date of Patent: Dec. 1, 2020

(54) APPLICATION PROCESSOR, AUTOMOTIVE ELECTRONIC PROCESSOR, AND COMPUTING DEVICE INCLUDING APPLICATION PROCESSOR

(71) Applicant: SAMSUNG ELECTRONICS CO., LTD., Suwon-si (KR)

(72) Inventor: Jae-Heon Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 163 days.

(21) Appl. No.: 16/058,713

(22) Filed: Aug. 8, 2018

(65) Prior Publication Data
US 2019/0243736 A1 Aug. 8, 2019

(30) Foreign Application Priority Data
Feb. 5, 2018 (KR) .................. 10-2018-0013950

(51) Int. Cl.
G06F 11/00 (2006.01)
G06F 11/26 (2006.01)
G06F 11/273 (2006.01)
G06F 11/07 (2006.01)
G06F 11/22 (2006.01)
G06F 1/3203 (2019.01)

(52) U.S. Cl.
CPC ............ G06F 11/26 (2013.01); G06F 1/3203 (2013.01); G06F 11/0778 (2013.01); G06F 11/0793 (2013.01); G06F 11/221 (2013.01); G06F 11/2236 (2013.01); G06F 11/273 (2013.01)

(58) Field of Classification Search
CPC .. G06F 11/0778; G06F 11/0793; G06F 11/26; G06F 11/2236; G06F 11/273
See application file for complete search history.

(56) References Cited

U.S. PATENT DOCUMENTS

| 6,385,683 | B1 | 5/2002 | Dekoning et al. |
| 6,754,690 | B2 | 6/2004 | Larson |
| 7,373,460 | B2 | 5/2008 | Kobayashi et al. |
| 8,275,975 | B2 | 9/2012 | Ors et al. |
| 8,566,495 | B2 | 10/2013 | Venkatsuresh et al. |
| 8,751,703 | B2 | 6/2014 | Hatula et al. |
| 8,898,448 | B2 | 11/2014 | Lingenbrunn et al. |
| 9,043,457 | B2 | 5/2015 | Park et al. |
| 9,363,468 | B2 | 6/2016 | Mondal et al. |
| 2008/0147905 | A1 | 6/2008 | Shi et al. |
| 2009/0254692 | A1 | 10/2009 | Feehrer |
| 2014/0289434 | A1* | 9/2014 | Ranganathan .......... G06F 13/42 710/105 |
| 2016/0124874 | A1 | 5/2016 | Hassan |
| 2016/0179738 | A1* | 6/2016 | Guddeti .............. G06F 11/3027 714/56 |

(Continued)

Primary Examiner — Charles Ehne
(74) Attorney, Agent, or Firm — Volentine, Whitt & Francos, PLLC

(57) ABSTRACT

An application processor includes a central processing unit, a root complex that communicates with at least one external device under control of the central processing unit and generates a state change interrupt when an operation state changes, and an interrupt aggregation and debug unit that performs debugging on at least one component associated with the state change interrupt depending on the state change interrupt.

20 Claims, 9 Drawing Sheets

(56) References Cited

U.S. PATENT DOCUMENTS

| | | |
|---|---|---|
| 2016/0187952 A1* | 6/2016 | Gough ................ G06F 13/4282 |
| | | 713/340 |
| 2016/0224442 A1* | 8/2016 | Sanghi ................ G06F 13/4022 |
| 2016/0299808 A1 | 10/2016 | Yoshida |
| 2017/0075834 A1 | 3/2017 | Cha et al. |
| 2017/0090987 A1 | 3/2017 | Hearn et al. |
| 2017/0091013 A1 | 3/2017 | Tallam et al. |

* cited by examiner

APPLICATION PROCESSOR, AUTOMOTIVE ELECTRONIC PROCESSOR, AND COMPUTING DEVICE INCLUDING APPLICATION PROCESSOR

CROSS-REFERENCE TO RELATED APPLICATIONS

This application claims priority under 35 U.S.C. § 119 to Korean Patent Application No. 10-2018-0013950 filed on Feb. 5, 2018, in the Korean Intellectual Property Office, the disclosure of which is incorporated by reference herein in its entirety.

BACKGROUND

Embodiments of the disclosure herein relate to a semiconductor device, and more particularly, relate to an application processor, an automotive electronic processor, and a computing device including the application processor.

A processor is configured to execute various objects such as firmware, an operating system, and an application and to control peripheral devices. To achieve a high processing speed, the processor is configured to communicate with the peripheral devices through a high-speed interface such as a peripheral component interconnect express (PCIe) interface.

For example, the processor may be manufactured to include a PCIe-based root complex. The peripheral devices may be manufactured to include a PCIe-based switch or end point interface.

The PCIe interface has been developed with the purpose of achieving a high speed. However, as a low-power design is nowadays required, attempts are being made to achieve a low-power PCIe interface. As attempts are made to achieve a low-power PCIe interface, unintended malfunctions may be caused.

SUMMARY

Embodiments of the disclosure provide an application processor and an automotive electronic processor, which automatically debug and recover a malfunction caused in a communication interface, and a computing device including the application processor.

According to an exemplary embodiment, an application processor includes a central processing unit, a root complex that communicates with at least one external device under control of the central processing unit and generates a state change interrupt when an operation state changes, and an interrupt aggregation and debug unit that performs debugging on at least one component associated with the state change interrupt depending on the state change interrupt.

According to an exemplary embodiment, an automotive electronic processor includes a central processing unit, a root complex that communicates with at least one external device under control of the central processing unit and generates an interrupt, and an interrupt aggregation and debug unit that performs debugging on at least one component associated with the interrupt depending on the interrupt. The at least one external device includes at least one of a brake controller, a steering controller, a power train controller, a lamp controller, an image sensor, an engine controller, a battery controller, a wiper controller, a safety controller, and a display controller.

According to an exemplary embodiment, a computing device includes an application processor and a device that communicate with each other. The application processor includes a central processing unit, a root complex that communicates with the device, a bus that connects the central processing unit and the root complex, and an interrupt aggregation and debug unit that communicates with the root complex through the bus. The device includes an end point interface configured to communicate with the root complex, and the interrupt aggregation and debug unit performs debugging of the root complex and the end point interface.

According to an exemplary embodiment, an application processor includes a central processing unit, a root complex circuit, and an interrupt and debug circuit. The central processing unit executes firmware, an operating system, or an application and has an interrupt controller that resolves a first interrupt. The root complex circuit communicates with an external device under control of the central processing unit and generates a second interrupt when an operation state changes. The interrupt and debug circuit exclusively receives the second interrupt from the root complex circuit and resolves the second interrupt without communicating the second interrupt to the central processing unit.

BRIEF DESCRIPTION OF THE FIGURES

The above and other objects and features of the disclosure will become apparent by describing in detail exemplary embodiments thereof with reference to the accompanying drawings.

DETAILED DESCRIPTION

Below, embodiments of the disclosure may be described in detail and clearly to such an extent that an ordinary one in the art easily implements the disclosure.

Figure 1:
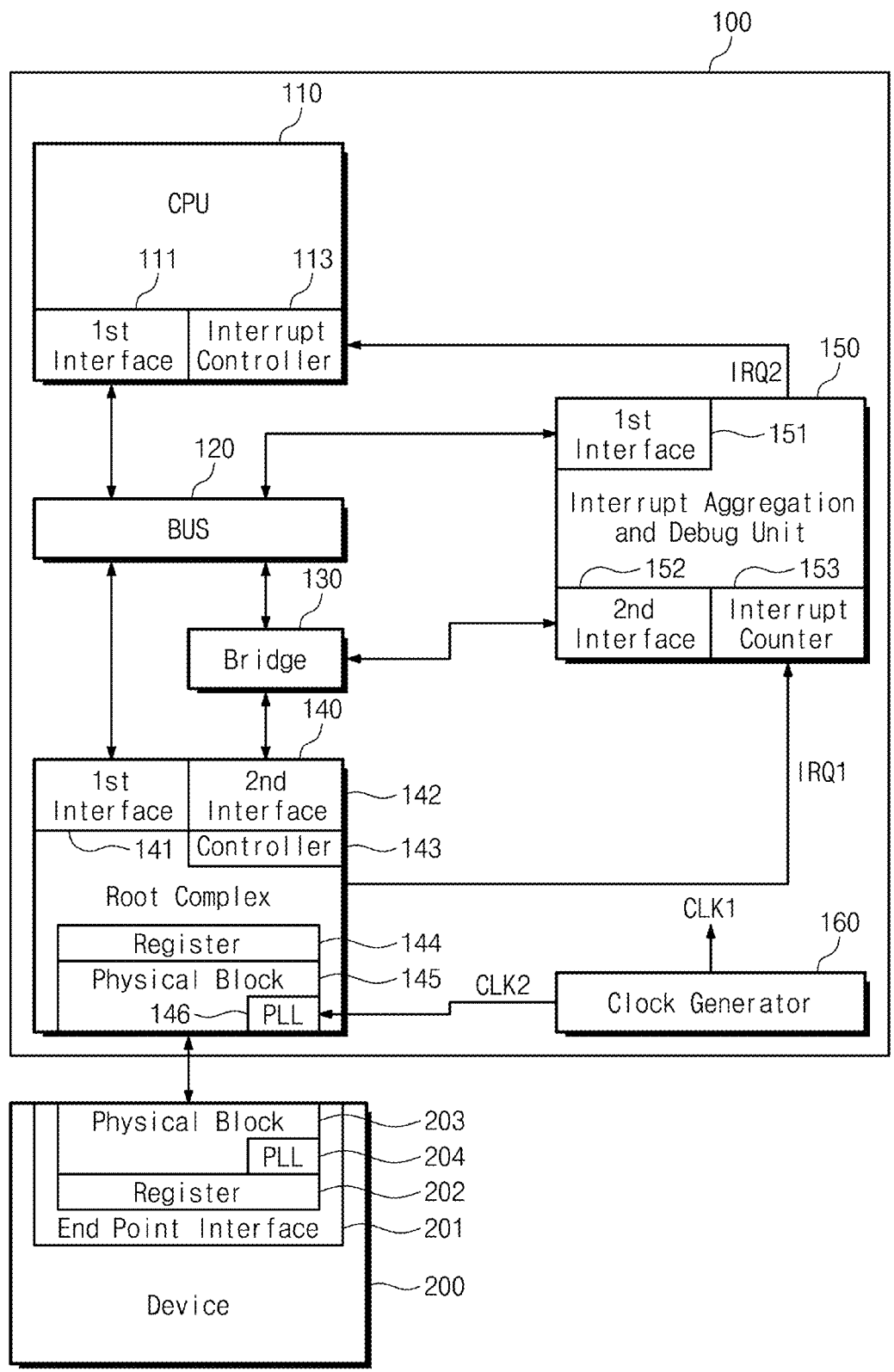
FIG. 1 is a block diagram illustrating a computing device according to an embodiment of the disclosure.

FIG. 1 is a block diagram illustrating a computing device 10 according to an embodiment of the disclosure. Referring to FIG. 1, the computing device 10 includes a processor 100 and a device 200. The processor 100 may communicate with the device 200. The processor 100 may include one of various processors such as an application processor and an automotive electronic processor.

The processor 100 may include a central processing unit (CPU) 110, a bus 120, a bridge 130, a root complex 140, an interrupt aggregation and debug unit 150, and a clock generator 160. The central processing unit 110 may execute various objects such as firmware, an operating system, and an application. The central processing unit 110 may control components of the processor 100 or the device 200.

The central processing unit 110 includes a first interface 111 and an interrupt controller 113. The first interface 111 is configured to communicate with the bus 120. For example, the first interface 111 may include a master device of an AXI (Advanced eXtensible Interface).

The interrupt controller 113 may receive a second interrupt IRQ2 from the interrupt aggregation and debug unit 150. The interrupt controller 113 may process the second interrupt IRQ2. For example, the interrupt controller 113 may suspend a current operation and may request a core of the central processing unit 110 to process the second interrupt IRQ2.

When the core of the central processing unit 110 completely processes the second interrupt IRQ2, the interrupt controller 113 may clear the second interrupt IRQ2 thus processed. The core of the central processing unit 110 may resume the suspended operation. For example, the second interrupt IRQ2 may be sent from the interrupt aggregation and debug unit 150 without passing through the bus 120.

The bus 120 is configured to communicate with the first interface 111, the bridge 130, and a first interface 141 of the root complex 140. The bus 120 may arbitrate communications between the first interface 111, the bridge 130, and the first interface 141 of the root complex 140. The bus 120 may include an AXI bus.

The bridge 130 may change a first communication scheme of the bus 120 to a second communication scheme. For example, the first communication scheme may include a high-speed AXI. The second communication scheme may include a low-speed APB (Advanced Peripheral Bus). The first communication scheme may support a high-speed communication for data communication, and the second communication scheme may support a control communication such as setting of a special function register (SFR).

The bridge 130 may communicate with a second interface 142 of the root complex 140 and a second interface 152 of the interrupt aggregation and debug unit 150 depending on the second communication scheme.

The root complex 140 may communicate with the central processing unit 110 through the bus 120 and may communicate with the device 200. The root complex 140 includes the first interface 141, the second interface 142, a controller 143, a register 144, and a physical block 145.

The first interface 141 may communicate with the bus 120 by using the first communication scheme (e.g., AXI). The first interface 141 may include an AXI slave interface. The first interface 141 may be connected with the root complex 140.

The second interface 142 may communicate with the bridge 130 by using the second communication scheme (e.g., APB). The second interface 142 may be connected with the controller 143. For example, the controller 143 may include glue logic that is connected to inputs and outputs of a core of the root complex 140 and is configured to control inputs and outputs.

The register 144 may include a command register that sends a command to the root complex 140, a status register that stores information of states of various components in the root complex 140, a malfunction register that stores malfunction information (e.g., an error log) of various components in the root complex 140, etc.

The physical block 145 is configured to exchange signals with the device 200 depending on a defined rule. The physical block 145 may correspond to a physical layer of OSI (Open System Interconnection). The physical block 145 includes a phase locked loop (PLL) 146.

The phase locked loop 146 may receive a second clock CLK2 from the clock generator 160. The phase locked loop 146 may generate a reference clock used in the physical block 145, based on the second clock CLK2.

The interrupt aggregation and debug unit 150 may communicate with the bus 120 and the bridge 130. The interrupt aggregation and debug unit 150 may receive a first interrupt IRQ1 from the root complex 140. The first interrupt IRQ1 may be received through a separate channel that does not pass through a first interface 151 and a second interface 152.

The interrupt aggregation and debug unit 150 may manage the first interrupt IRQ1. For example, the interrupt aggregation and debug unit 150 may perform debugging on the root complex 140 and the device 200 connected with the root complex 140 depending on the first interrupt IRQ1. The interrupt aggregation and debug unit 150 may send a portion of the first interrupt IRQ1 to the interrupt controller 113 as the second interrupt IRQ2.

The interrupt aggregation and debug unit 150 includes the first interface 151, the second interface 152, and an interrupt counter 153. The first interface 151 may communicate with the bus 120 by using the first communication scheme (e.g., AXI). For example, the first interface 151 may include an AXI master interface.

The interrupt aggregation and debug unit 150 may communicate with the first interface 141 of the root complex 140 through the bus 120. That is, in addition to the central processing unit 110, the interrupt aggregation and debug unit 150 may also be connected with the root complex 140 and may communicate with the root complex 140.

The second interface 152 may communicate with the bridge 130 by using the second communication scheme (e.g., APB). The second interface 152 may be used for the central processing unit 110 to control settings of the interrupt aggregation and debug unit 150. The interrupt counter 153 may be used to count the first interrupt IRQ1 received from the root complex 140. For example, the interrupt counter 153 may be used to count and aggregate the first interrupt IRQ1.

The clock generator 160 may generate a first clock CLK1 and the second clock CLK2. The first clock CLK1 may be supplied to components of the processor 100, such as the central processing unit 110, the bus 120, the bridge 130, and the interrupt aggregation and debug unit 150. The second clock CLK2 may be supplied to the root complex 140. A frequency of the first clock CLK1 may be identical to or different from a frequency of the second clock CLK2.

The device 200 may communicate with the root complex 140 of the processor 100 through an end point interface 201. The end point interface 201 of the device 200 may include a register 202 and a physical block 203.

The register 202 may include a command register that sends a command to the end point interface 201, a status register that stores information of states of various components of the end point interface 201, etc.

The physical block 203 is configured to exchange signals with the physical block 145 of the root complex 140 depending on a defined rule. The physical block 203 may correspond to a physical layer of the OSI (Open System Interconnection). The physical block 203 includes a phase locked loop (PLL) 204.

The phase locked loop 204 may receive a clock from the root complex 140. The phase locked loop 204 may generate a reference clock used in the physical block 203, based on a clock received from the root complex 140.

Below, an operation of the computing device 10 will be described. The central processing unit 110 may communicate with the first interface 141 of the root complex 140 through the first interface 111 and the bus 120. The central processing unit 110 may perform data communication with the device 200 through the root complex 140.

The central processing unit 110 may communicate with the second interface 142 of the root complex 140 through the first interface 111, the bus 120, and the bridge 130. The central processing unit 110 may control settings of the root complex 140 (e.g., settings stored in the register 144) through the first interface 111, the bus 120, and the bridge 130.

The central processing unit 110 may communicate with the second interface 152 of the interrupt aggregation and debug unit 150 through the first interface 111, the bus 120, and the bridge 130. The central processing unit 110 may control settings of the interrupt aggregation and debug unit 150 through the first interface 111, the bus 120, and the bridge 130.

The interrupt aggregation and debug unit 150 may communicate with the first interface 141 of the root complex 140 through the first interface 151 and the bus 120. The interrupt aggregation and debug unit 150 may debug states (e.g., information stored in the register 144) associated with the core, the physical block 145, or the first interface 141 of the root complex 140 through the first interface 151 and the bus 120 and may perform recovering depending on a result of the debugging.

The interrupt aggregation and debug unit 150 may communicate with the end point interface 201 of the device 200 through the first interface 151, the bus 120, the first interface 141 of the root complex 140, and the core of the root complex 140. The interrupt aggregation and debug unit 150 may debug states (e.g., information stored in the register 202) associated with a core or the physical block 203 of the end point interface 201 in the device 200 through the first interface 151, the bus 120, and the root complex 140 and may perform recovering depending on a result of the debugging.

The interrupt aggregation and debug unit 150 may communicate with the second interface 142 of the root complex 140 through the first interface 151, the bus 120, and the bridge 130. The interrupt aggregation and debug unit 150 may debug states (e.g., information stored in the register 144) associated with the controller 143 or the second interface 142 of the root complex 140 through the first interface 151 and the bus 120 and may perform recovering depending on a result of the debugging.

For example, the interrupt aggregation and debug unit 150 may perform debugging in response to the first interrupt IRQ1 sent from the root complex 140. For example, the interrupt aggregation and debug unit 150 may be configured to perform debugging in response to a state change interrupt indicating a change of an operation state of the root complex 140 or a malfunction indicating a malfunction.

For example, the interrupt aggregation and debug unit 150 may be further configured to aggregate the first interrupt IRQ1. For example, the interrupt aggregation and debug unit 150 may access (or scan) the root complex 140 or the end point interface 201 depending on the first interrupt IRQ1 and may perform a given operation.

The interrupt aggregation and debug unit 150 may count the first interrupt IRQ1 and may process (e.g., clear) the first interrupt IRQ1. When the first interrupt IRQ1 is processed by a given count, the interrupt aggregation and debug unit 150 may send the second interrupt IRQ2 to the central processing unit 110. The interrupt aggregation and debug unit 150 may perform interrupt aggregation by sending the second interrupts IRQ2, the number of which is less than the number of the first interrupts IRQ1.

For example, the interrupt aggregation and debug unit 150 may include a state machine that transitions between given states. For example, the interrupt aggregation and debug unit 150 may include a sequencer that performs commands depending on a given order.

In the case where the interrupt aggregation and debug unit 150 is implemented with a state machine or a sequencer, an operation order or an operation method of the interrupt aggregation and debug unit 150 may be adjusted through a simple program. Accordingly, the flexibility of the interrupt aggregation and debug unit 150 is improved.

Figure 2:
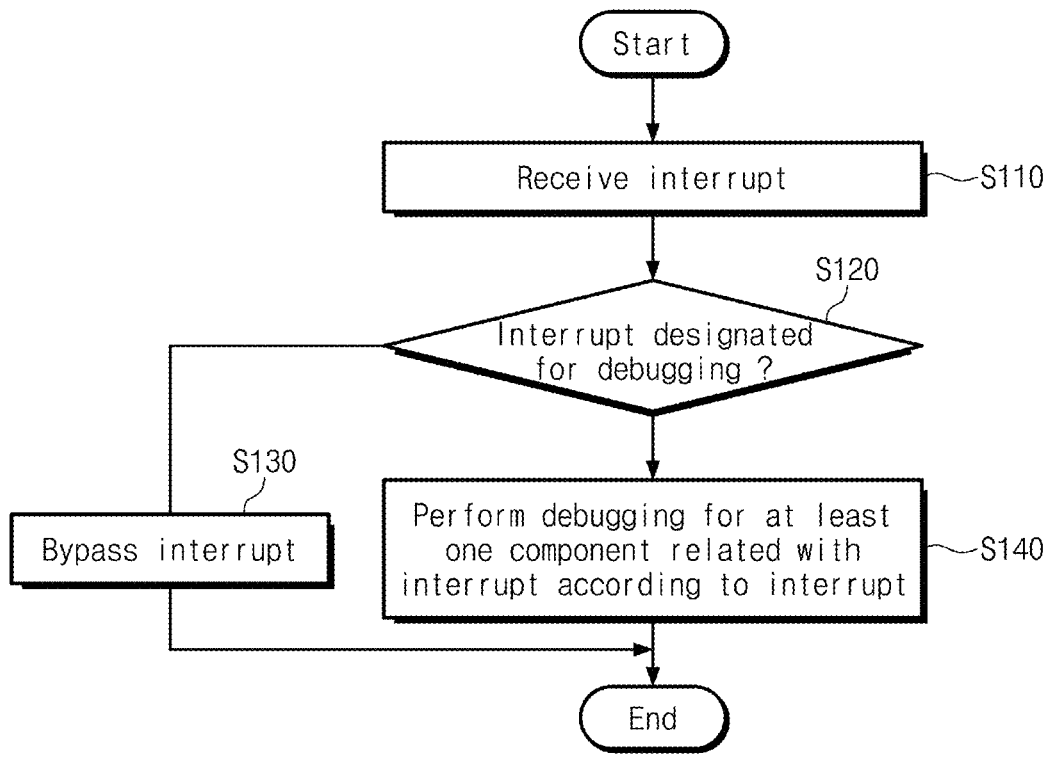
FIG. 2 is a flowchart illustrating an operation method of an interrupt aggregation and debug unit according to an embodiment of the disclosure.

FIG. 2 is a flowchart illustrating an operation method of the interrupt aggregation and debug unit 150 according to an embodiment of the disclosure. Referring to FIGS. 1 and 2, in operation S110, the interrupt aggregation and debug unit 150 may receive the first interrupt IRQ1 from the root complex 140.

In operation S120, the interrupt aggregation and debug unit 150 may determine whether the received first interrupt IRQ1 is an interrupt designated for debugging. For example, the first interrupt IRQ1 may have various kinds. A part of kinds of the first interrupt IRQ1 may be designated for the interrupt aggregation and debug unit 150 to perform debugging.

For example, the designated interrupt may include a state change interrupt indicating a change of an operation state (e.g., a power saving mode) of the root complex 140 or the end point interface 201. The designated interrupt may include a malfunction interrupt indicating that a malfunction occurs in the root complex 140 or the end point interface 201.

For example, the interrupt aggregation and debug unit 150 may read a register, which is associated with an interrupt, from among the register 144 of the root complex 140 and the register 202 of the end point interface 201. The interrupt aggregation and debug unit 150 may determine a kind of an interrupt depending on the value read from the register.

If the received first interrupt IRQ1 is not the interrupt designated for debugging, the interrupt aggregation and debug unit 150 may perform operation S130. In the operation S130, the interrupt aggregation and debug unit 150 may bypass the received first interrupt IRQ1 to the central processing unit 110 as the second interrupt IRQ2.

If the received first interrupt IRQ1 is the interrupt designated for debugging, the interrupt aggregation and debug unit 150 may perform operation S140. In the operation S140, the interrupt aggregation and debug unit 150 may perform debugging for at least one component related with the received first interrupt IRQ1, according to the received first interrupt IRQ1. For example, the at least one component may include the root complex 140 or the device 200 connected to the root complex 140.

For example, the debugging may include checking a register (e.g., 114 or 202) associated with the at least one component. The register may store information about a kind of the generated interrupt or information about an operation state of the at least one component. The interrupt aggregation and debug unit 150 may determine whether a malfunction occurs in the at least one component, by checking the register.

For example, after performing debugging, the interrupt aggregation and debug unit 150 may clear the first interrupt IRQ1 without sending the first interrupt IRQ1 to the central processing unit 110 or may send the first interrupt IRQ1 to the central processing unit 110 as the second interrupt IRQ2.

Figure 3:
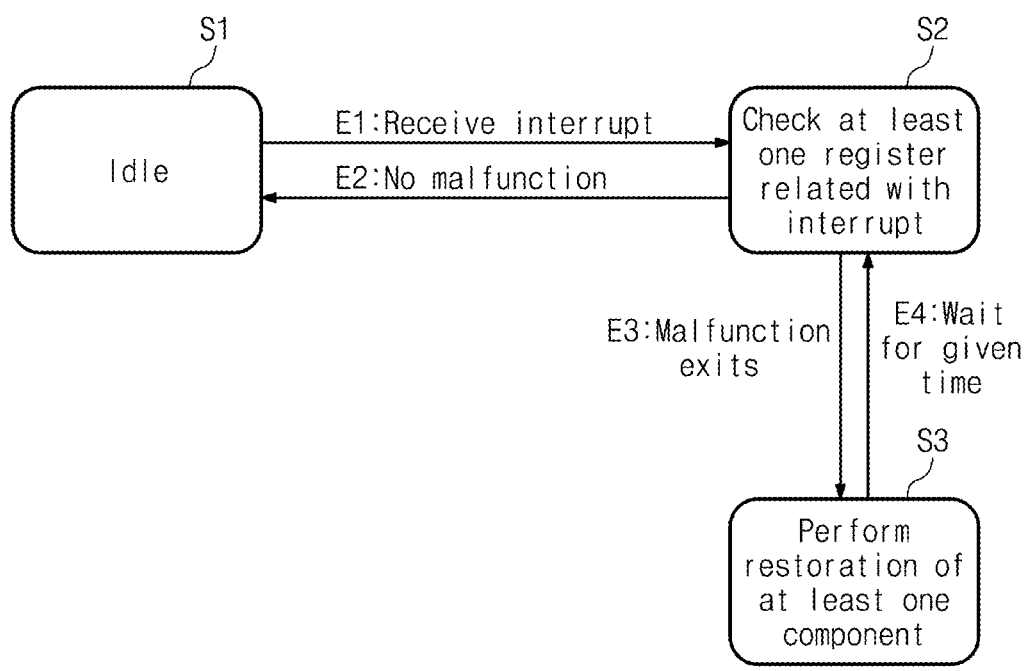
FIG. 3 is a state diagram illustrating an example in which an interrupt aggregation and debug unit operates.

FIG. 3 is a state diagram illustrating an example in which the interrupt aggregation and debug unit 150 operates. Referring to FIGS. 1 and 3, the interrupt aggregation and debug unit 150 may have one of a first state S1, a second state S2, and a third state S3.

The first state S1 may be an idle state. When the state change interrupt or the malfunction interrupt is not received as the first interrupt IRQ1, the interrupt aggregation and debug unit 150 may have the first state S1 (e.g., idle state).

When the interrupt aggregation and debug unit 150 is in the first state S1, a first event E1 that the state change interrupt or the malfunction interrupt is received as the first interrupt IRQ1 may occur. When the first event E1 occurs, the interrupt aggregation and debug unit 150 may switch from the first state S1 to the second state S2. The second state S2 may be a debugging state.

For example, the interrupt aggregation and debug unit 150 may enter the second state S2 after the state change interrupt is received and a certain time elapses. As the interrupt aggregation and debug unit 150 waits during the certain time, a time when a state change of the root complex 140 or the end point interface 201 is completed and the changed state is applied may be ensured.

In the second state S2, the interrupt aggregation and debug unit 150 may check at least one register (e.g., 144 or 202) related with the interrupt. For example, the interrupt aggregation and debug unit 150 may read a status register that stores state information of the root complex 140 and the end point interface 201.

For another example, the interrupt aggregation and debug unit 150 may check a malfunction register of the root complex 140 or the end point interface 201, which stores information (e.g., a log) about a malfunction. The interrupt aggregation and debug unit 150 may enter the first state Si or the third state S3 depending on a result of the check.

In the second state S2, when a second event E2 that a malfunction is absent in the root complex 140 or the end point interface 201 occurs, the interrupt aggregation and debug unit 150 may enter the first state S 1. Also, the interrupt aggregation and debug unit 150 may clear the state change interrupt or the malfunction interrupt without sending it to the central processing unit 110.

In the second state S2, when a third event E3 that a malfunction exists in the root complex 140 or the end point interface 201 occurs, the interrupt aggregation and debug unit 150 may enter the third state S3.

In the third state S3, the interrupt aggregation and debug unit 150 may perform restoration of at least one component associated with the interrupt. For example, the interrupt aggregation and debug unit 150 may control a register associated with the at least one component.

For example, the interrupt aggregation and debug unit 150 may perform recovering by resetting or initializing the associated register (e.g., a command register) or inputting a certain command to the associated register (e.g., a command register).

In the third state S3, when a fourth event E4 that the recovering is performed and a certain time (or a given time) elapses occurs, the interrupt aggregation and debug unit 150 may enter the second state S2. As the interrupt aggregation and debug unit 150 waits during the certain time, a time when a state change of the root complex 140 or the end point interface 201 is completed and the changed state is applied may be ensured.

In the second state S2, when the malfunction is recovered, the interrupt aggregation and debug unit 150 may clear the state change interrupt or the malfunction interrupt and may enter the first state S1. In the second state S2, when the malfunction is not recovered, the interrupt aggregation and debug unit 150 may again enter the third state S3.

That the interrupt aggregation and debug unit 150 transitions between the first to third states S1 to S3 may be executed by a set of commands designated for the interrupt aggregation and debug unit 150 to perform. For example, the set of commands may include a read command, a loop command, a branch in true command, a branch in false command, an update command of an internal register, a revise or write command, a revise and write command, etc.

The interrupt aggregation and debug unit 150 may perform debugging and recovering by performing first commands of the set of the commands, with respect to an interrupt of a first kind in which debugging is designated. The interrupt aggregation and debug unit 150 may perform debugging and recovering by performing second commands of the set of the commands, with respect to an interrupt of a second kind in which debugging is designated.

The set of commands that the interrupt aggregation and debug unit 150 executes may be revised, added, or deleted through the second interface 152. Commands that the interrupt aggregation and debug unit 150 executes depending on a kind of an interrupt may be revised, added, or deleted through the second interface 152. Accordingly, the interrupt aggregation and debug unit 150 may provide a high level of flexibility with regard to a change of an environment to which the processor 100 belongs. That is, the interrupt aggregation and debug unit 150 is readily reconstructible.

As described above, the interrupt aggregation and debug unit 150 may perform debugging on the root complex 140 or the end point interface 201 by checking a register. Also, the interrupt aggregation and debug unit 150 may perform recovering on the root complex 140 or the end point interface 201 by adjusting a value of a register. Accordingly, the reliability of the processor 100 and the computing device 10 is improved.

Also, when the recovering is successfully made, the interrupt aggregation and debug unit 150 may clear the interrupt without sending it to the central processing unit 110. Since an unnecessary interrupt is not sent to the central processing unit 110, the workload of the central processing unit 110 or the interrupt controller 113 may decrease, and the resource of the central processing unit 110 is secured.

Figure 4:
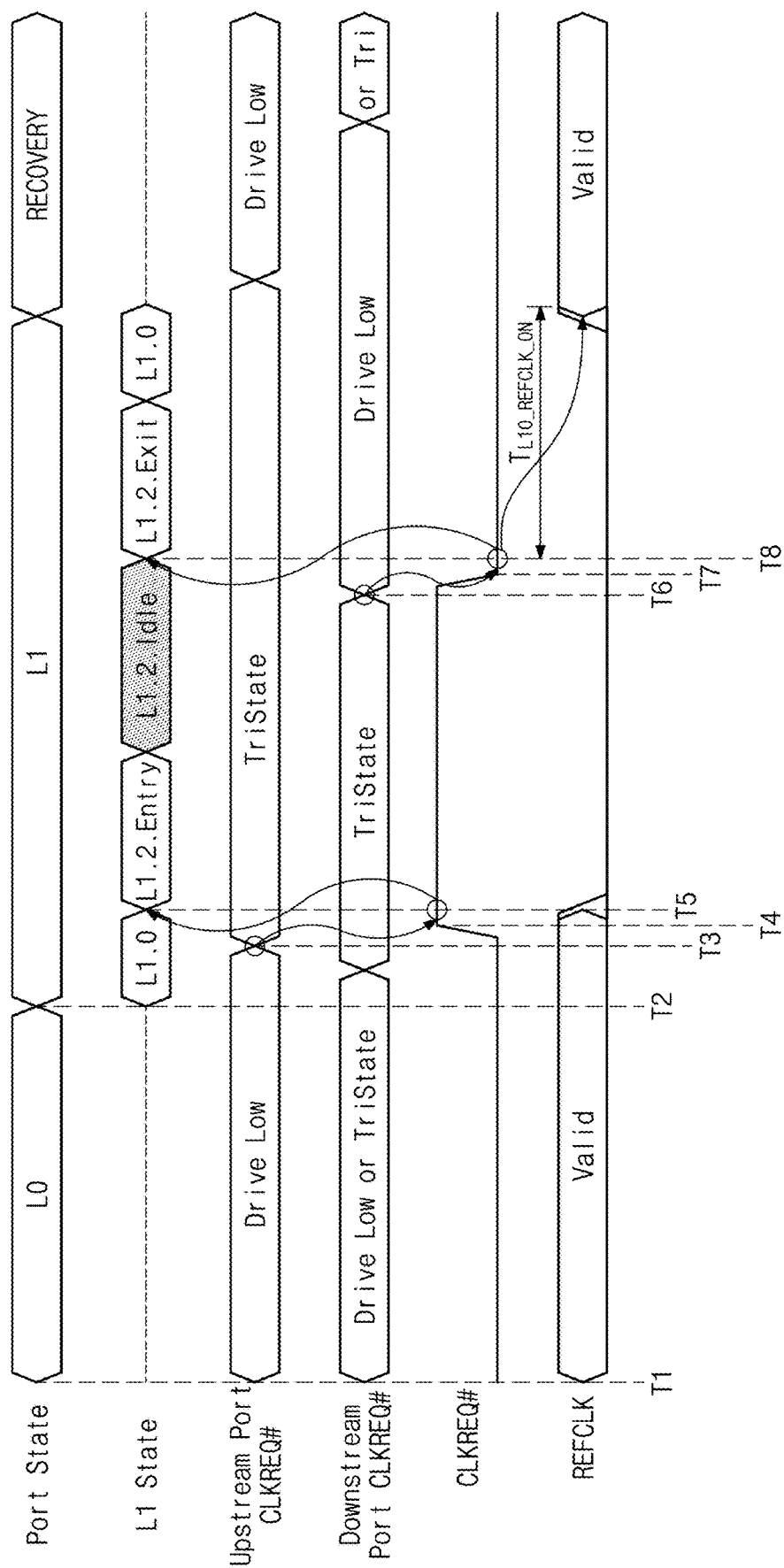
FIG. 4 illustrates an example of a state change of a root complex and an end point interface.

FIG. 4 illustrates an example of a state change of the root complex 140 and the end point interface 201. In an embodiment, an example in which PCIe-based ASPM (Active State Power Management) is performed is illustrated in FIG. 4. The active state power management (ASPM) may be performed by coordination between the root complex 140 and the end point interface 201 without a command or intervention of external devices such as the central processing unit 110, the bus 120, the bridge 130, and the interrupt aggregation and debug unit 150.

For example, the central processing unit 110, the bus 120, the bridge 130, or the interrupt aggregation and debug unit 150 may recognize the root complex 140 and the end point interface 201 as being in an active state. While recognized by an external component as being in the active state, the root complex 140 and the end point interface 201 may enter a power saving mode automatically (or actively).

When external components intend to perform data communication through the root complex 140 or the end point interface 201, the root complex 140 and the end point interface 201 may return to a higher power mode automatically (or actively). That is, the active state power management may be hidden or shadowed with regard to the external components.

Referring to FIG. 4, a state of the root complex 140 and the end point interface 201 may be a "L0" state at a first time T1. At the first time T1, a signal of an upstream port, that is, a signal CLKREQ # of a port of the end point interface 201 may be set to a low level. At the first time T1, a signal of a downstream port, that is, a signal CLKREQ # of a port of the end point interface 140 may be set to the low level or may be set to a third state TriState, for example, a high-impedance state.

Since the end point interface 201 drives the signal CLKREQ # with the low level, at the first time T1, the signal CLKREQ # may have the low level. In the "L0" state, the phase locked loop 146 or 204 of the root complex 140 or the end point interface 201 may maintain a reference clock REFCLK effectively (e.g., "Valid"). For example, the phase locked loop 146 or 204 may continuously generate and output the reference clock REFCLK.

At a second time T2, the root complex 140 and the end point interface 201 may enter a "L1" state. For example, when communication is not performed between the root complex 140 and the end point interface 201 during a certain time, the root complex 140 and the end point interface 201 may enter the "L1" state.

In detail, the root complex 140 and the end point interface 201 may enter a "L1.0" state. Between the second time T2 and a third time T3, the root complex 140 may set the signal CLKREQ # to the third state TriState, for example, the high-impedance state. At the third time T3, the end point interface 201 may set the signal CLKREQ # to the third state TriState, for example, the high-impedance state.

Since both the root complex 140 and the end point interface 201 set the signal CLKREQ # to the third state, for example, the high-impedance state, at a fourth time T4, the signal CLKREQ # may transition to a high level. As the signal CLKREQ # transitions to the high level, at a fifth time T5, the root complex 140 and the end point interface 201 may enter an "L1.2.idle" state through an "L1.2.Entry" state.

In an embodiment, the root complex 140 may output the state change interrupt as the first interrupt IRQ1 in response to the event that the root complex 140 and the end point interface 201 enters the "L1.2.Entry" state or the event that the signal CLKREQ # transitions to the high level.

The root complex 140 and the end point interface 201 may stop generating the reference clock REFCLK in response to the event that the root complex 140 and the end point interface 201 enters the "L1.2.Entry" state or the event that the signal CLKREQ # transitions to the high level. For example, the root complex 140 and the end point interface 201 may deactivate the phase locked loops 146 and 204.

After the root complex 140 and the end point interface 201 enters the "L1.2.Idle" state, an external component may intend to perform data communication by using the root complex 140 or the end point interface 201. In this case, the root complex 140 or the end point interface 201 may request a return from the "L1.2.Idle" state by using the signal CLKREQ #.

In an embodiment, at a sixth time T6, the root complex 140 may drive the signal CLKREQ # with the low level. Since the root complex 140 drives the signal CLKREQ # with the low level, at a seventh time T7, the signal CLKREQ # may transition to the low level. As the signal CLKREQ # transitions to the low level, at an eighth time T8, the root complex 140 and the end point interface 201 may enter a "L1.2.Exit".

In an embodiment, the root complex 140 may output the state change interrupt as the first interrupt IRQ1 in response to the event that the root complex 140 and the end point interface 201 enters the "L1.2.Exit" state or the event that the signal CLKREQ # transitions to the low level.

Afterwards, the root complex 140 and the end point interface 201 may enter a "L1.0" state and may terminate the "L1" state. The root complex 140 and the end point interface 201 may enter a state for a return to the "L0" state.

While the root complex 140 and the end point interface 201 enters the "L1.0" state from the "L1.2.Idle" state, the root complex 140 and the end point interface 201 should generate the reference clock REFCLK. The root complex 140 and the end point interface 201 may activate the phase locked loops 146 and 204 in response to the event that the root complex 140 and the end point interface 201 enters the "L1.2.Exit" state or the event that the signal CLKREQ # transitions to the low level.

In an embodiment, the root complex 140 and the end point interface 201 should generate valid reference clocks REFCLK within a certain time period $T_{L10\_REFCLK\_ON}$. However, the event that the reference clocks REFCLK are not generated due to a malfunction that locking is not made in the phase locked loops 146 and 204 may occur. For example, in the case where the processor 100 or the device 200 deteriorates due to an environmental factor such as impact, high-temperature, or low-temperature, a malfunction that a phase is not locked in one of the phase locked loops 146 and 204 may be caused.

When the reference clocks REFCLK are not generated within the certain time period $T_{L10\_REFCLK\_ON}$ in the root complex 140 or the end point interface 201, the root complex 140 may determine that link down occurs. Depending on a result of the determination, the root complex 140 may reset the physical block 145 of the root complex 140 and the physical block 203 of the end point interface 201.

The link down and the reset of the physical blocks 145 and 203 need a given time. Accordingly, the link down and the reset of the physical blocks 145 and 203 may cause a degradation of latency and performance of the root complex 140 and the end point interface 201.

The interrupt aggregation and debug unit 150 according to an embodiment of the disclosure may check the registers 144 and 202 of the root complex 140 and the end point interface 201 in response to the first interrupt IRQ1 including the state change interrupt. For example, the interrupt aggregation and debug unit 150 may check status registers that store information of states of the phase locked loops 146 and 204.

When it is checked that a phase locked loop is not locked, the interrupt aggregation and debug unit 150 may reset (or initialize) a phase locked loop, which is not locked, from among the phase locked loops 146 and 204. For example, the interrupt aggregation and debug unit 150 may reset (or initialize) command registers associated with the phase locked loops 146 and 204 among the registers 144 and 202 or may store a certain command value in the command registers.

The interrupt aggregation and debug unit 150 may recover malfunctions of the phase locked loops 146 and 204 by controlling a phase locked loop, which is not locked, so as to attempt locking again. Accordingly, even though the processor 100 or the device 200 deteriorates, the reliability of the processor 100 or the device 200 may be secured, and the lifespan thereof may be extended.

Figure 5:
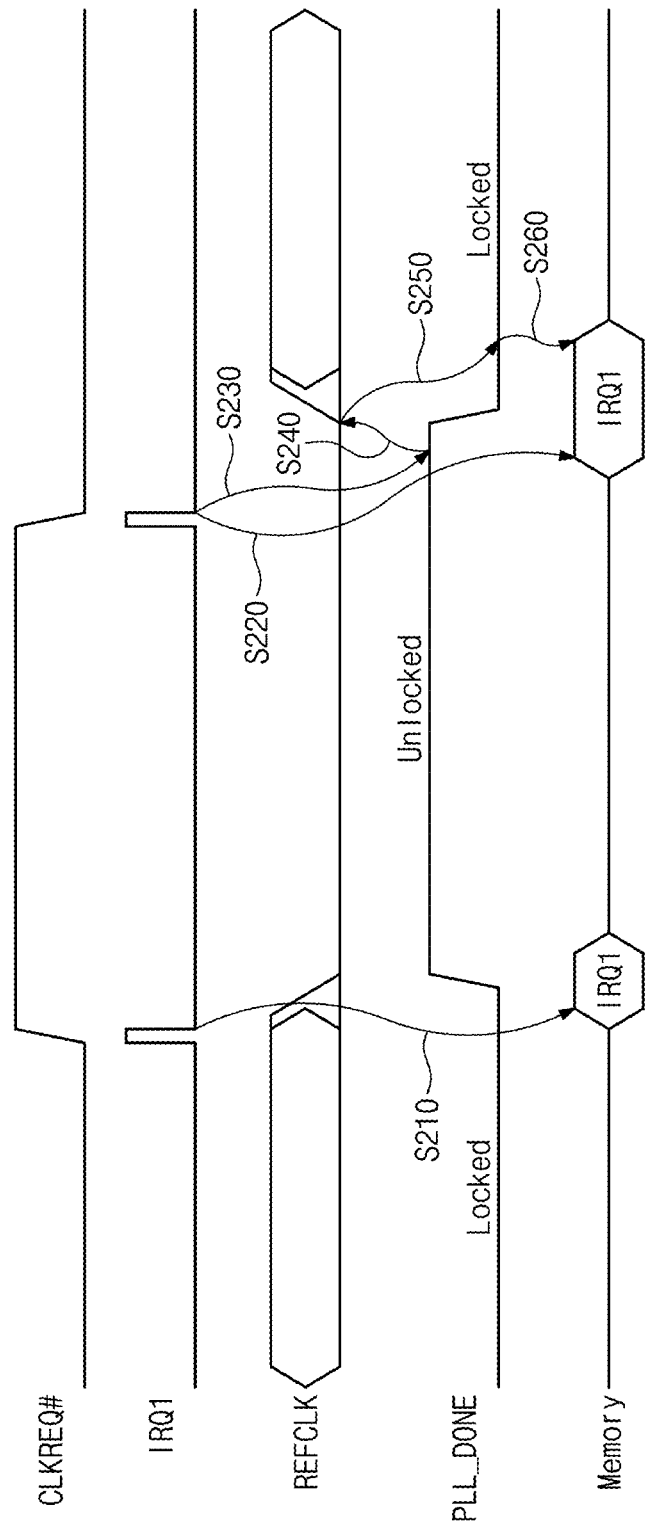
FIG. 5 illustrates an example in which an interrupt aggregation and debug unit performs debugging and recovering.

FIG. 5 illustrates an example in which the interrupt aggregation and debug unit 150 performs debugging and recovering. Referring to FIGS. 1 and 5, for example, as the signal CLKREQ # transitions to the high level, the interrupt aggregation and debug unit 150 may output the first interrupt IRQ1. The first interrupt IRQ1 may include a state change interrupt providing notification that the root complex 140 and the end point interface 201 enter the "L1.2" state.

In operation S210, the first interrupt IRQ1 may be stored in the interrupt counter 153 of the interrupt aggregation and debug unit 150. The interrupt aggregation and debug unit 150 may manage a kind of the first interrupt IRQ1. When the first interrupt IRQ1 is the state change interrupt indicating the entry to the "L1.2" state, the interrupt aggregation and debug unit 150 may clear the first interrupt IRQ1 from the interrupt counter 153 without sending it to the central processing unit 110.

As the signal CLKREQ # transitions to the high level, a phase locked loop (e.g., 146) may stop generating the reference clock REFCLK. As the generation of the reference clock REFCLK is stopped, a status register PLL_DONE, which stores information indicating that the phase locked loop 146 is successfully locked, of the register 144 may be updated to store a high level indicating "Unlocked".

As the signal CLKREQ # transitions to the low level, the interrupt aggregation and debug unit 150 may output the first interrupt IRQ1. The first interrupt IRQ1 may include a state change interrupt providing notification that the root complex 140 and the end point interface 201 terminate (or exit from) the "L1.2" state.

In operation S220, the first interrupt IRQ1 may be stored in the interrupt counter 153 of the interrupt aggregation and debug unit 150. The interrupt aggregation and debug unit 150 may manage a kind of the first interrupt IRQ1. When the first interrupt IRQ1 is a state change interrupt indicating an end of the "L1.2" state, in operation S230, the interrupt aggregation and debug unit 150 may check the status register PLL_DONE.

Since the status register PLL_DONE stores the high level indicating "Unlocked", the interrupt aggregation and debug unit 150 may reset or initialize the phase locked loop 146 or a command register associated with the phase locked loop 146. In response to the reset or initialization, in operation S240, the phase locked loop 146 may start to generate the reference clock REFCLK.

As the reference clock REFCLK is generated, the status register PLL_DONE may be updated to store the low level indicating "Locked". In operation S250, the interrupt aggregation and debug unit 150 may again check the status register PLL_DONE.

Since the status register PLL_DONE stores the low level indicating "Locked", in operation S260, the interrupt aggregation and debug unit 150 may clear the first interrupt IRQ1 from the interrupt counter 153.

As described above, the interrupt aggregation and debug unit 150 according to an embodiment of the disclosure may check whether the phase locked loop 146 is locked. When the phase locked loop 146 is not locked, the interrupt aggregation and debug unit 150 may allow the phase locked loop 146 to again attempt a locking operation. Accordingly, the occurrence of the link down is prevented, and the latency and performance of the root complex 140 and the end point interface 201 are improved.

In the above-described embodiment, the interrupt aggregation and debug unit 150 is described as performing debugging and recovering with regard to the phase locked loop 146. However, the interrupt aggregation and debug unit 150 may perform debugging and recovering on any other components of the root complex 140 or the end point interface 201 in addition to the phase locked loop 146.

For example, the interrupt aggregation and debug unit 150 may perform various debugging and recovering, such as debugging and recovering of a locking success of a clock and data recovery (CDR) block, debugging and recovering of a control success of an auto frequency control (AFC) block, and error debugging and recovering.

Figure 6:
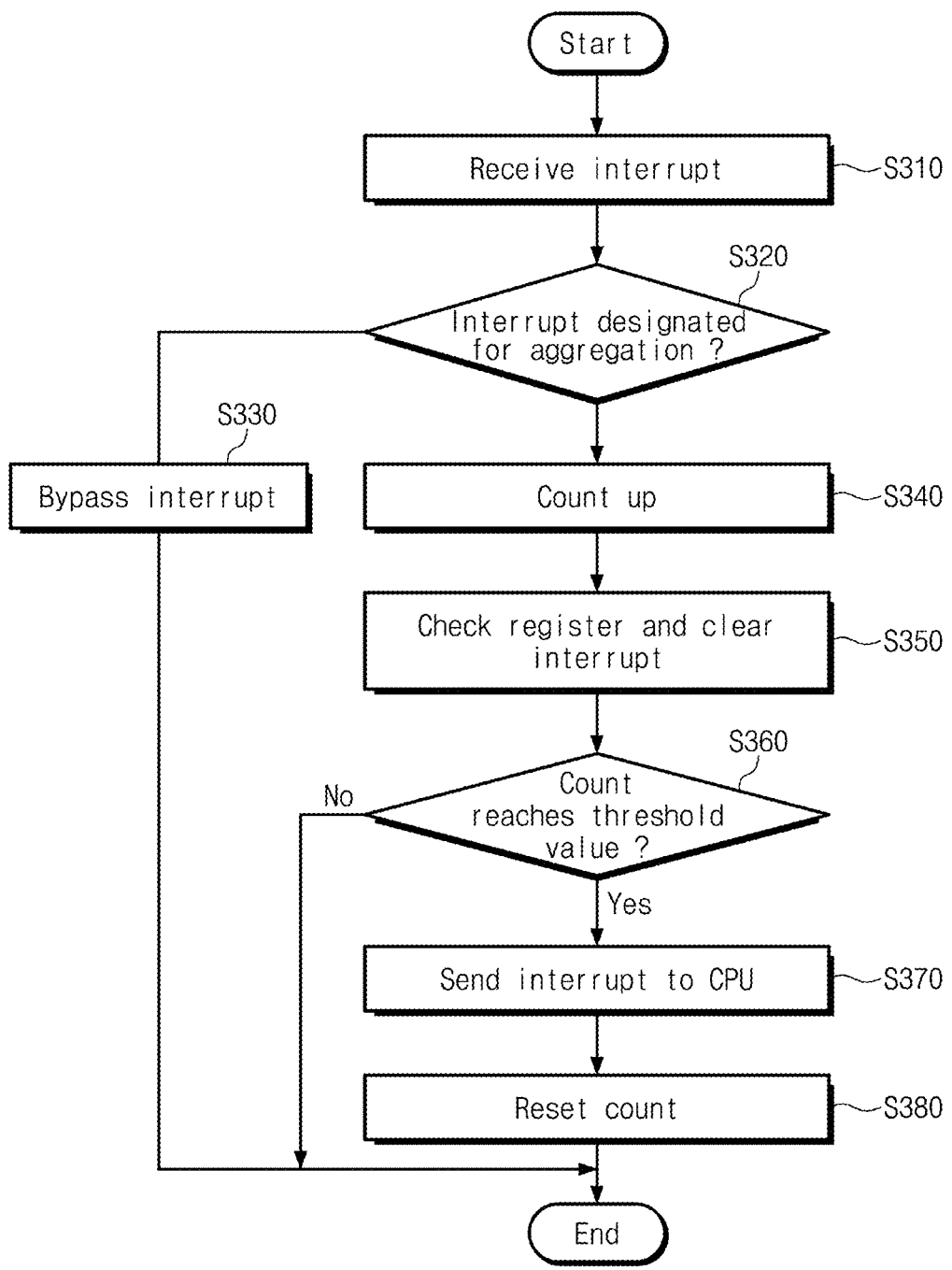
FIG. 6 is a flowchart illustrating an example in which an interrupt aggregation and debug unit according to an embodiment of the disclosure aggregates and manages interrupts.

FIG. 6 is a flowchart illustrating an example in which the interrupt aggregation and debug unit 150 according to an embodiment of the disclosure aggregates and manages interrupts. Referring to FIGS. 1 and 6, in operation S310, the interrupt aggregation and debug unit 150 may receive the first interrupt IRQ1.

In operation S320, the interrupt aggregation and debug unit 150 may determine whether the received first interrupt IRQ1 is an interrupt designated for aggregation (or targeted for aggregation). For example, the designated interrupt may include a data interrupt. The root complex 140 may output the data interrupt upon performing data communication with the end point interface 201. For example, the root complex 140 may output the data interrupt whenever a transaction of data is made.

For example, the interrupt aggregation and debug unit 150 may determine a kind of the first interrupt IRQ1 by checking (or scanning) an interrupt register of the register 144 of the root complex 140 or the register 202 of the end point interface 201.

When the received first interrupt IRQ1 is not the interrupt designated for aggregation, in operation S330, the interrupt aggregation and debug unit 150 may bypass the first interrupt IRQ1 to the central processing unit 110 as the second interrupt IRQ2. Afterwards, the interrupt aggregation and debug unit 150 may terminate an operation associated with the first interrupt IRQ1.

If the received first interrupt IRQ1 is the interrupt designated for aggregation, in operation S340, the interrupt aggregation and debug unit 150 may increase a count of the interrupt counter 153. In operation S350, the interrupt aggregation and debug unit 150 may perform commands defined according to a kind of an interrupt to read or write (e.g. check) the register 144 or 202 of the root complex 140 or the end point interface 201. Also, the interrupt aggregation and debug unit 150 may clear the first interrupt IRQ1 by initializing an interrupt value of the interrupt register.

In operation S360, the interrupt aggregation and debug unit 150 may determine whether a count of the interrupt counter 153 reaches a threshold value. When the count of the interrupt counter 153 does not reach the threshold value, the interrupt aggregation and debug unit 150 may terminate an operation associated with the first interrupt IRQ1.

When the count of the interrupt counter 153 reaches the threshold value, operation S370 is performed. In operation S370, the interrupt aggregation and debug unit 150 may send the second interrupt IRQ2 to the central processing unit 110. In operation S380, the interrupt aggregation and debug unit 150 may reset the count. That is, the interrupt aggregation and debug unit 150 may aggregate data interrupts sent from the root complex 140 and may send a result of the aggregation to the central processing unit 110.

As the amount of data exchanged between the device 200 and the processor 100 increases, the number of data interrupts that the root complex 140 outputs may sharply increase. That the central processing unit 110 or the interrupt controller 113 individually processes the sharply increased data interrupts may cause an increase in a workload of the central processing unit 110.

The interrupt aggregation and debug unit 150 according to an embodiment of the disclosure may be configured to aggregate data interrupts and to send a result of the aggregation to the interrupt controller 113 of the central processing unit 110. Accordingly, the central processing unit 110 or the interrupt controller 113 may aggregate and process data interrupts, and thus, the workload of the central processing unit 110 decreases.

Figure 7:
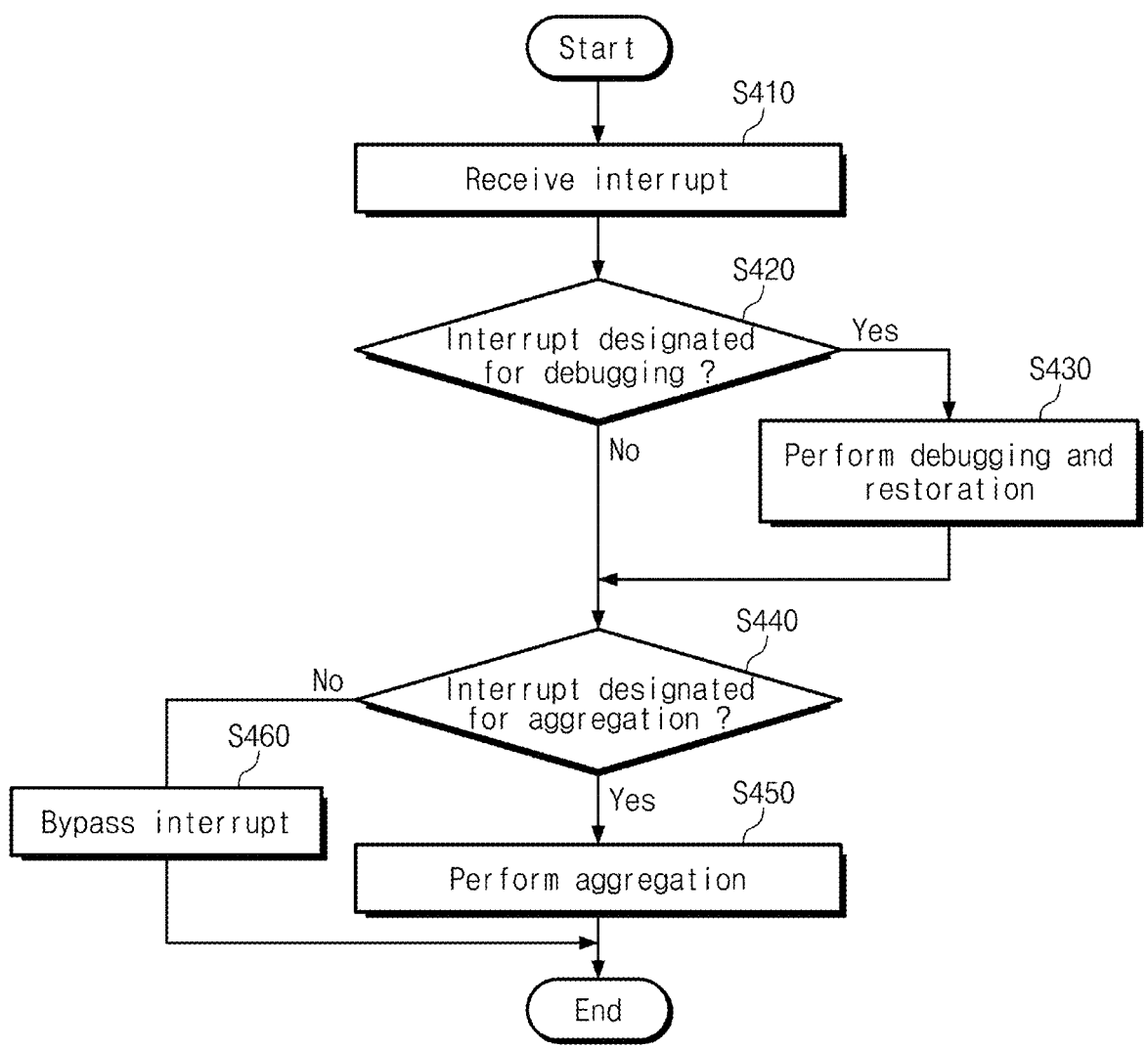
FIG. 7 is a flowchart illustrating an example in which an interrupt aggregation and debug unit according to an embodiment of the disclosure performs debugging, recovering, and aggregation processing.

FIG. 7 is a flowchart illustrating an example in which the interrupt aggregation and debug unit 150 according to an embodiment of the disclosure performs debugging, recovering, and aggregation processing. Referring to FIGS. 1 and 7, in operation S410, the interrupt aggregation and debug unit 150 may receive the first interrupt IRQ1 from the root complex 140.

For example, the first interrupt IRQ1 may include a state change interrupt, a malfunction interrupt, or a data interrupt. In operation S420, the interrupt aggregation and debug unit 150 may determine whether the first interrupt IRQ1 is an interrupt designated for debugging.

In the case where the first interrupt IRQ1 is the interrupt designated for debugging, the interrupt aggregation and debug unit 150 may perform operation S430. In operation S430, the interrupt aggregation and debug unit 150 may perform debugging and recovering as described with reference to FIGS. 2 to 5.

In the case where the first interrupt IRQ1 is not the interrupt designated for debugging, the interrupt aggregation and debug unit 150 may perform operation S440. In operation S440, the interrupt aggregation and debug unit 150 may determine whether the first interrupt IRQ1 is the interrupt designated for aggregation.

In the case where the first interrupt IRQ1 is the interrupt designated for aggregation, in operation S450, the interrupt aggregation and debug unit 150 may perform aggregation. The operation S450 may correspond to operation S330 to operation S370 of FIG. 6. In the case where the first interrupt IRQ1 is not the interrupt designated for aggregation, in operation S460, the interrupt aggregation and debug unit 150 may bypass the first interrupt IRQ1.

In FIG. 7, it is illustrated that the operation S430 is performed followed by the operation S440. In this case, the interrupt aggregation and debug unit 150 may not clear the first interrupt IRQ1 after performing the operation S430. Alternatively, the operation S430 may be performed followed by clearing the first interrupt IRQ1. In this case, the interrupt aggregation and debug unit 150 may skip the operations S440 to S460.

As described above, the interrupt aggregation and debug unit 150 according to an embodiment of the disclosure may perform debugging and recovering to process the state change interrupt or the malfunction interrupt automatically. Also, the interrupt aggregation and debug unit 150 may aggregate and manage data interrupts by performing aggregation.

Accordingly, with regard to interrupts occurring in the root complex 140, the workload of the central processing unit 110 may decrease, and thus, the resource efficiency of the central processing unit 110 may be improved.

Figure 8:
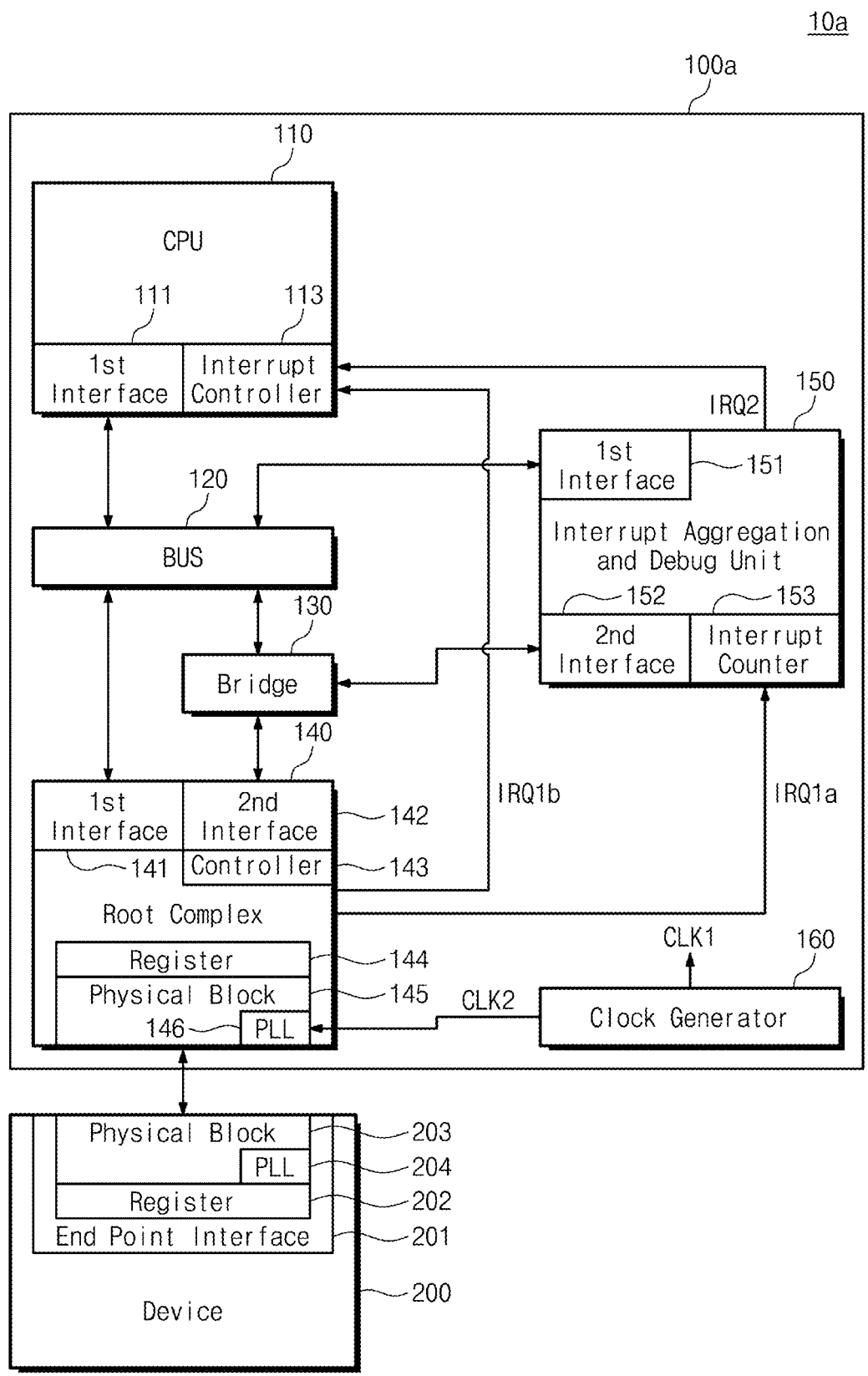
FIG. 8 is a block diagram illustrating an application example of a computing device of FIG. 1.

FIG. 8 is a block diagram illustrating an application example of the computing device 10 of FIG. 1. Referring to FIG. 8, a computing device 10*a* may include a processor 100*a* and a device 200. Components of the processor 100*a* and the device 200 are identical to components of the processor 100 and the device 200 of FIG. 1, and thus, a description thereof will not be repeated here.

Compared with FIG. 1, a part IRQ1*a* of first interrupts IRQ1*a* and IRQ1*b* from the root complex 140 of FIG. 8 may be sent to the interrupt aggregation and debug unit 150, and the other IRQ1*b* may be directly sent to the central processing unit 110. A kind of the interrupts IRQ1*a* corresponding to the part and a kind of the interrupts IRQ1*b* corresponding to the other may be adjusted through the second interface 142.

Figure 9:
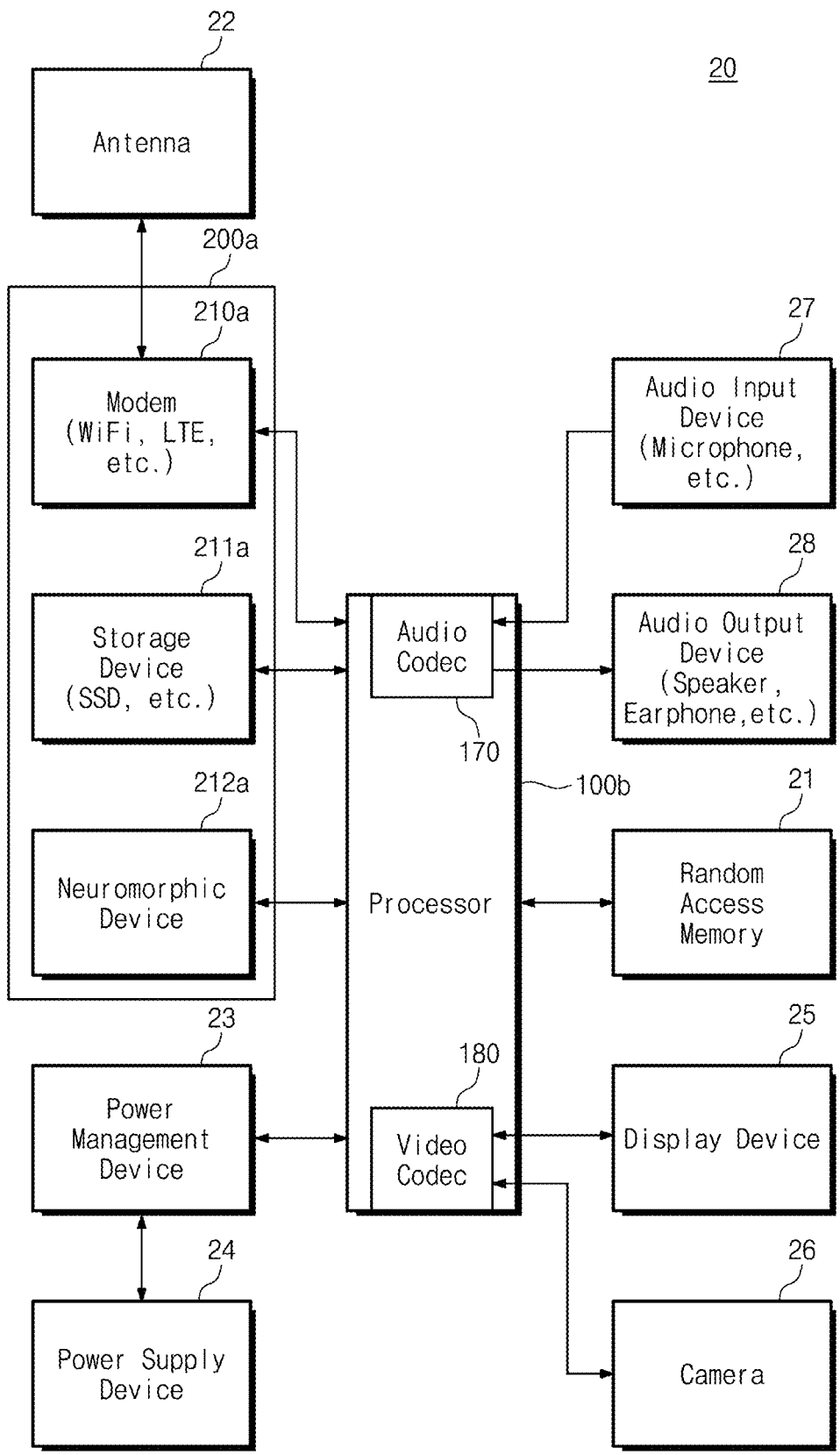
FIG. 9 is a block diagram illustrating a computing device according to another embodiment of the disclosure.

FIG. 9 is a block diagram illustrating a computing device 20 according to another embodiment of the disclosure. For example, the computing device 20 may correspond to at least one of a smartphone, a smart pad, a smart television, a smart watch, and a wearable device.

Referring to FIGS. 1 and 9, the computing device 20 includes a processor 100*b*, devices 200*a*, a random access memory 21, an antenna 22, a power supply management device 23, a power supply device 24, a display device 25, a camera 26, an audio input device 27, and an audio output device 28.

The processor 100*b* may be an application processor. The processor 100*b* may include the processor 100 or 100*a* described with reference to FIG. 1 or 8. For example, the processor 100*b* may include the central processing unit 110, the bus 120, the bridge 130, the root complex 140, the interrupt aggregation and debug unit 150, and the clock generator 160 described with reference to FIG. 1.

Like the processor 100 or 100*a* described with reference to FIG. 1 or 8, the processor 100*b* may include debugging, recovering, and aggregation depending on an interrupt. Unlike the processor 100 or 100*a* described with reference to FIG. 1 or 8, the processor 100*b* may further include an audio codec 170 and a video codec 180.

The audio codec 170 may create or store audio data and may reproduce (or play) the audio data. For example, the audio codec 170 may encode data obtained by the audio input device 27 to create the audio data. The audio codec 170 may decode audio data created by the audio input device 27 or audio data stored in a storage device 211*a* or the random access memory 21 and may reproduce (or play) the decoded audio data through the audio output device 28.

The video codec 180 may create or play video data. For example, the video codec 180 may encode data obtained by the camera 26 to create video data. The video codec 180 may decode video data created by the camera 26 or video data stored in the storage device 211*a* or the random access memory 21 and may reproduce (or display) the decoded video data through the display device 25.

The devices 200*a* may communicate with the processor 100*b*. The devices 200*a* may include a modem 210*a*, the storage device 211*a*, and a neuromorphic device 212*a*. The modem 210*a*, the storage device 211*a*, and the neuromorphic device 212*a* may communicate with the processor 100*b* depending on schemes described with reference to FIGS. 1 to 7.

For example, each of the modem 210*a*, the storage device 211*a*, and the neuromorphic device 212*a* may include the end point interface 201 and may communicate with the processor 100*b* through the end point interface 201. The interrupt aggregation and debug unit 150 of the processor 100*b* may perform debugging and recovering on the end point interface 201 of each of the modem 210*a*, the storage device 211*a*, and the neuromorphic device 212*a*.

The modem 210*a* may communicate with an external device through the antenna 22. For example, the modem 210*a* may be configured to communicate with an external device based on at least one of various wireless communication schemes such as long term evolution (LTE), WiMax, global system for mobile communication (GSM), code division multiple access (CDMA), Bluetooth, near field communication (NFC), Wi-Fi, and radio frequency identification (RFID).

The modem 210*a* may communicate with the external device, based on at least one of various wired communication schemes such as universal serial bus (USB), serial AT attachment (SATA), high speed interchip (HSIC), small computer system interface (SCSI), Firewire, peripheral component interconnection (PCI), PCI express (PCIe), non-volatile memory express (NVMe), universal flash storage (UFS), secure digital (SD), SDIO, universal asynchronous receiver transmitter (UART), serial peripheral interface (SPI), high speed SPI (HS-SPI), RS232, inter-integrated circuit (I2C), HS-I2C, integrated-interchip sound (I2S), Sony/Philips digital interface (S/PDIF), multimedia card (MMC), and embedded MMC (eMMC).

The storage device 211*a* may be used as an auxiliary storage device of the processor 100*b*. For example, source codes of various applications or an operating system executable by the processor 100*b* and a variety of data generated by the operating system or applications for long-term storage may be stored in the storage device 211*a*.

The storage device 211*a* may include a solid state drive (SSD) that is based on a nonvolatile memory such as a flash memory, a phase-change RAM (PRAM), a magnetic RAM (MRAM), a ferroelectric RAM (FRAM), or a resistive RAM (RRAM).

The neuromorphic device 212*a* may perform machine learning. For example, the neuromorphic device 212*a* may receive information from the processor 100*b* and may perform machine learning based on the information. The neuromorphic device 212*a* may create a classifier as a result of the machine learning.

When certain information is input, the classifier may classify and output a result associated with the certain information. The neuromorphic device 212*a* may perform machine learning by performing classification through information and feeding back a difference between a result of the classification and an actual result.

The neuromorphic device 212*a* may be configured to drive the classifier created by the machine learning. The neuromorphic device 212*a* may receive certain information from the processor 100*b* and may classify a result associated with the certain information. The neuromorphic device 212*a* may return a result of the classification to the processor 100*b*.

The neuromorphic device 212*a* may be configured to be suitable for parallel operations. For example, the neuromorphic device 212*a* may have a structure based on a graphic processing unit (GPU) or a structure specially designed to be suitable to perform a parallel operation.

The random access memory 21 may be used as a main memory of the processor 100*b*. For example, the random access memory 21 may store various data and process codes to be processed by the processor 100*b*. The random access memory 21 may include a dynamic random access memory (DRAM), a static RAM (SRAM), a phase-change RAM (PRAM), a magnetic RAM (MRAM), a ferroelectric RAM (FRAM), a resistive RAM (RRAM), etc.

A power management circuit 23 may distribute or supply a power from the power supply device 24 to components of the computing device 20. The power management circuit 23 may adjust the amount of power to be distributed or supplied to the components of the computing device 20 depending on a state of the computing device 20 or the amount of tasks to be performed by the computing device 20.

For example, the power management circuit 23 may control a power saving mode of the computing device 20 or each component of the computing device 20. The power supply device 24 may include a power supply installed in an artificial structure, such as building, or a portable battery.

The display device 25 may display video data reproduced (or played) by the video codec 180. For example, the display device 25 may include a liquid crystal display (LCD), an organic light-emitting diode (OLED) display, an active matrix OLED (AMOLED) display, a flexible display, an electronic ink, etc.

The audio input device 27 may convert external sound into audio data. The audio input device 27 may include a microphone, etc. The audio output device 28 may convert audio data to sound. The audio output device 28 may include a speaker, an earphone, etc.

In the above-described embodiment, the audio codec 170 and the video codec 180 are described as being included in the processor 100*b*. However, the audio codec 170 and the video codec 180 may be placed outside the processor 100*b*. The audio codec 170 or the video codec 180 may include the end point interface 201, and may be changed to communicate with the processor 100*b* through the end point interface 201.

In an embodiment, the modem 210*a* may be divided and disposed outside and inside the processor 100*b*. For example, a modem for LTE may be disposed inside the processor 100*b*, and a modem for Wi-Fi may be disposed outside the processor 100*b* as a part of the devices 200*a*.

Figure 10:
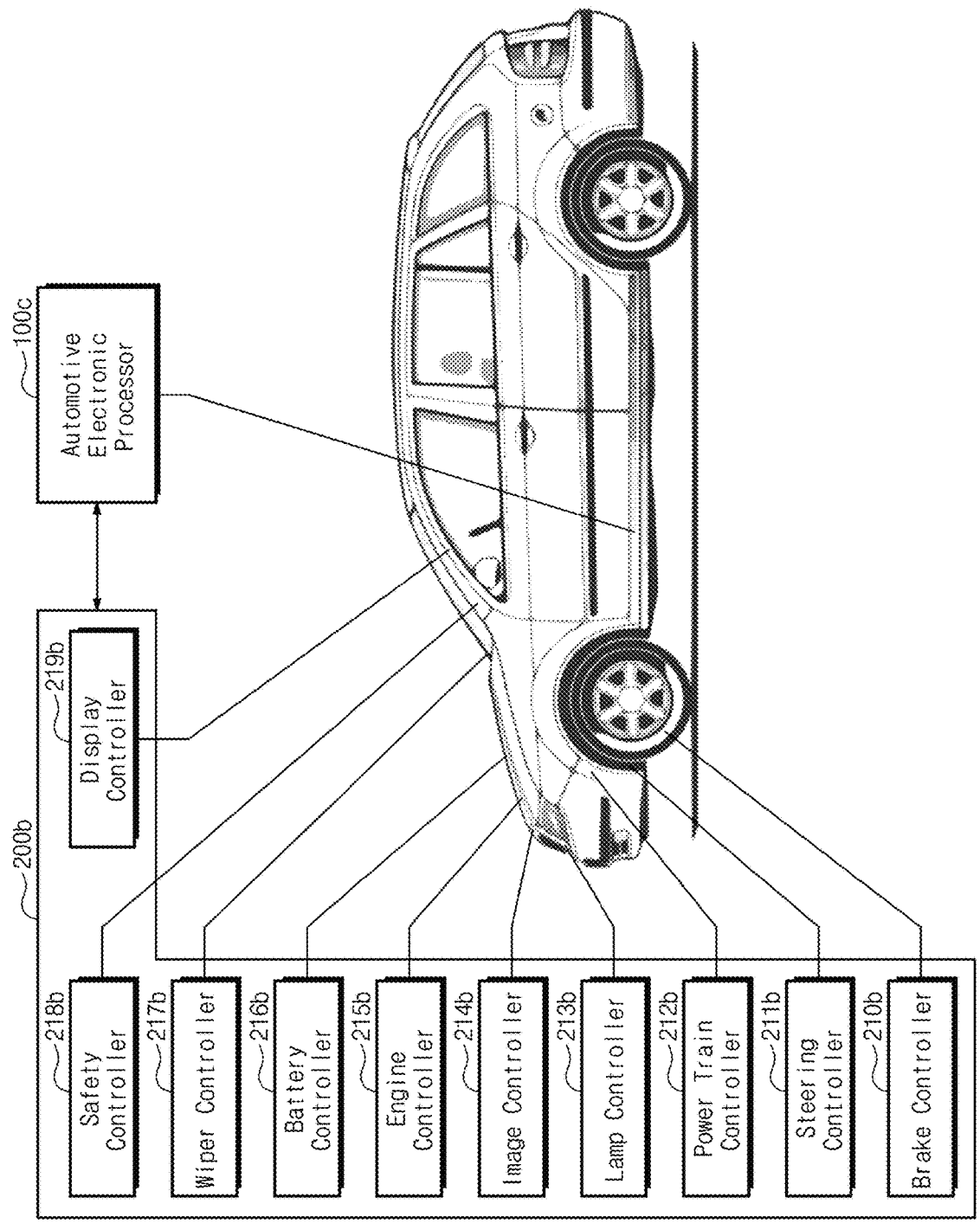
FIG. 10 is a diagram illustrating an automotive electronic processor and automotive electronic devices according to an embodiment of the disclosure.

FIG. 10 is a diagram illustrating an automotive electronic processor 100*c* and automotive electronic devices 200*b* according to an embodiment of the disclosure. Referring to FIG. 9, the automotive electronic processor 100*c* may include the processor 100 or 100*a* described with reference to FIG. 1 or 8. For example, the automotive electronic processor 100*c* may include the central processing unit 110, the bus 120, the bridge 130, the root complex 140, and the interrupt aggregation and debug unit 150.

The automotive electronic processor 100*c* may communicate with the automotive electronic devices 200*b* through the root complex 140. The interrupt aggregation and debug unit 150 of the automotive electronic processor 100*c* may perform debugging and recovering on the root complex 140 and the end point interface 201 of each of the automotive electronic devices 200*b*. The interrupt aggregation and debug unit 150 of the automotive electronic processor 100*c* may aggregate and manage data interrupts.

The automotive electronic devices 200*b* may include a brake controller 210*b*, a steering controller 211*b*, a power train controller 212*b*, a lamp controller 213*b*, an image controller 214*b*, an engine controller 215*b*, a battery controller 216*b*, a wiper controller 217*b*, a safety controller 218*b*, and a display controller 219*b*.

Each of the brake controller 210*b*, the steering controller 211*b*, the power train controller 212*b*, the lamp controller 213*b*, the image controller 214*b*, the engine controller 215*b*, the battery controller 216*b*, the wiper controller 217*b*, the safety controller 218*b*, and the display controller 219*b* may include the end point interface 201, and may communicate with the automotive electronic processor 100c through the end point interface 201.

The brake controller 210b may include sensors that sense a state of a brake. The brake controller 210b may send sensing results of the sensors to the automotive electronic processor 100c through the end point interface 201. The brake controller 210b may further include a controller for controlling the brake. The brake controller 210b may receive a control command from the automotive electronic processor 100c through the end point interface 201. The brake controller 210b may control the brake depending on the control command.

The steering controller 211b may include sensors that sense a state of a steering. The steering controller 211b may send sensing results of the sensors to the automotive electronic processor 100c through the end point interface 201. The steering controller 211b may further include a controller for controlling the steering. The steering controller 211b may receive a control command from the automotive electronic processor 100c through the end point interface 201. The steering controller 211b may control the steering depending on the control command.

Likewise, the power train controller 212b may send sensing results of sensors associated with a power train to the automotive electronic processor 100c. The power train controller 212b may control the power train depending on a control command from the automotive electronic processor 100c. The lamp controller 213b may send sensing results of sensors associated with lamps to the automotive electronic processor 100c. The lamp controller 213b may control the lamps depending on a control command from the automotive electronic processor 100c.

The image controller 214b may sense a scene, with a sensor, and encode, with an encoder, a scene within a field of vision to image data and may send the image data to the automotive electronic processor 100c. The engine controller 215b may send sensing results of sensors associated with an engine to the automotive electronic processor 100c. The engine controller 215b may control the engine depending on a control command from the automotive electronic processor 100c.

The battery controller 216b may send information about a state of a battery to the automotive electronic processor 100c. The battery controller 216b may control settings of the battery depending on a control command from the automotive electronic processor 100c. The wiper controller 217b may send sensing results of sensors associated with an external environment (e.g., whether it rains) to the automotive electronic processor 100c. The wiper controller 217b may control wipers depending on a control command from the automotive electronic processor 100c.

The safety controller 218b may send, to the automotive electronic processor 100c, sensing results of sensors associated with safety devices such as a seat belt, an airbag, and electronic controlled suspension (ECS). For another example, the safety controller 218b may send a sensing result associated with an external environment (e.g., inclination, fall, and collision) to the automotive electronic processor 100c. The safety controller 218b may control the safety devices depending on a control command from the automotive electronic processor 100c.

The display controller 219b may send sensing results of sensors associated with an external environment (e.g., intensity of illumination and a moving speed) to the automotive electronic processor 100c. Depending on a control command from the automotive electronic processor 100c, the display controller 219b may adjust the intensity of illumination of a display device or may limit content to be displayed.

In the above-described embodiments, components according to embodiments of the disclosure are referred to by using the term "block". The "block" may be implemented with various hardware devices, such as an integrated circuit (IC), an application specific IC (ASCI), a field programmable gate array (FPGA), and a complex programmable logic device (CPLD), software, such as firmware and applications driven in hardware devices, or a combination of a hardware device and software. Also, "block" may include circuits or intellectual property (IP) implemented with semiconductor devices.

Even though not defined separately in the above-described embodiments, components mentioned in the above-described embodiments may be implemented with various hardware devices, firmware that is driven in hardware devices, software such as an application, or a combination of a hardware device and software, or may be implemented with an intellectual property (IP).

According to the disclosure, an interrupt aggregation and debug unit may perform debugging on at least one device associated with an interrupt, depending on the interrupt of a root complex. Accordingly, an application processor and an automotive electronic processor, which automatically debug and recover a malfunction caused in a communication interface, and a computing device including the application processor are provided.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been described with reference to exemplary embodiments thereof, it will be apparent to those of ordinary skill in the art that various changes and modifications may be made thereto without departing from the spirit and scope of the disclosure as set forth in the following claims.

What is claimed is:
1. An application processor comprising:
a central processing unit;
a root complex that communicates with an external device under control of the central processing unit and generates a state change interrupt when an operation state changes; and an interrupt aggregation and debug unit that performs debugging on a component associated with the state change interrupt depending on the state change interrupt, wherein the root complex generates the state change interrupt in response to change of a power saving state of the root complex.

2. The application processor of claim 1, wherein the change of the power saving state includes a change according to active state power management (ASPM).

3. The application processor of claim 1, wherein the interrupt aggregation and debug unit performs the debugging by checking registers of the root complex.

4. The application processor of claim 1, further comprising:
a bus connected with the central processing unit that communicates with the central processing unit depending on a first communication scheme; and
a bridge connected with the bus that changes the first communication scheme to a second communication scheme, wherein:
the root complex includes:
a first interface that communicates with the bus depending on the first communication scheme; and
a second interface that communicates with the bridge depending on the second communication scheme.

5. The application processor of claim 4, wherein the interrupt aggregation and debug unit performs the debugging by checking registers of the root complex through the bus and the first interface.

6. The application processor of claim 4, wherein the interrupt aggregation and debug unit performs the debugging by checking registers of an external device, which is connected with the root complex, through the bus and the root complex.

7. The application processor of claim 4, wherein the interrupt aggregation and debug unit performs the debugging by checking registers associated with the second interface through the bus, the bridge, and the second interface.

8. The application processor of claim 1, wherein the interrupt aggregation and debug unit performs a recovery from a malfunction of the root complex depending on a result of the debugging.

9. The application processor of claim 8, wherein the interrupt aggregation and debug unit performs the recovery from the malfunction by initializing a value of a register in the root complex depending on the result of the debugging.

10. The application processor of claim 8, wherein the interrupt aggregation and debug unit performs the recovery from the malfunction by initializing a value of a register in an external device, which is connected to the root complex, through the root complex depending on the result of the debugging.

11. The application processor of claim 1, wherein:
the root complex includes a phase locked loop, and
the debugging includes checking whether a lock of the phase locked loop is achieved.

12. The application processor of claim 11, wherein the interrupt aggregation and debug unit performs recovering for initialization of the phase locked loop when the lock of the phase locked loop fails.

13. The application processor of claim 1, wherein the interrupt aggregation and debug unit clears the state change interrupt without sending the state change interrupt to the central processing unit.

14. The application processor of claim 1, wherein the interrupt aggregation and debug unit:
increases an interrupt count when an interrupt designated for aggregation is received from the root complex; and
sends an interrupt to the central processing unit when the interrupt count reaches a threshold value.

15. The application processor of claim 1, wherein the interrupt aggregation and debug unit receives a plurality of interrupts from the root complex, passes first interrupts among the plurality of interrupts to the central processing unit, and aggregates second interrupts among the plurality of interrupts.

16. The application processor of claim 15, wherein the interrupt aggregation and debug unit aggregates the first interrupts without passing the first interrupts to the central processing unit.

17. An automotive electronic processor comprising:
a central processing unit;
a root complex that communicates with an external device under control of the central processing unit and to generate an interrupt when an operation state changes; and
an interrupt aggregation and debug unit that performs debugging on a component associated with the interrupt depending on the interrupt, wherein:
the external device includes a brake controller, a steering controller, a power train controller, a lamp controller, an image controller, an engine controller, a battery controller, a wiper controller, a safety controller, or a display controller, and
the interrupt aggregation and debug unit clears the interrupt without sending the interrupt to the central processing unit.

18. The automotive electronic processor of claim 17, wherein the interrupt aggregation and debug unit performs recovering of a malfunction depending on a result of the debugging.

19. A computing device comprising:
an application processor and a device that communicate with each other, wherein:
the application processor includes:
a central processing unit;
a root complex that communicates with the device;
a bus that connects the central processing unit and the root complex; and
an interrupt aggregation and debug unit that communicates with the root complex through the bus,
the device includes an end point interface that communicates with the root complex, and
the interrupt aggregation and debug unit:
performs debugging of the root complex and the end point interface depending on a state change interrupt indicating a change of a state of the root complex;
increases an interrupt count in response to a data interrupt occurring while the root complex is communicating with the end point interface; and
sends an interrupt to the central processing unit when the interrupt count reaches a threshold value.

20. The computing device of claim 19, wherein the device includes at least one of a Wi-Fi modem, a solid-state drive, and a neuromorphic device.

* * * * *

UNITED STATES PATENT AND TRADEMARK OFFICE
CERTIFICATE OF CORRECTION

PATENT NO. : 10,853,214 B2  
APPLICATION NO. : 16/058713  
DATED : December 1, 2020  
INVENTOR(S) : Jae-Heon Lee Page 1 of 1

It is certified that error appears in the above-identified patent and that said Letters Patent is hereby corrected as shown below:

In the Claims

Column 20, Line 14, Claim 16 change "first" to -- second --;

Column 20, Line 15, Claim 16 change "first" to -- second --.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*